I. G. SUNDELL.
NAVIGATOR'S APPARATUS.
APPLICATION FILED NOV. 11, 1910.

1,104,844.

Patented July 28, 1914.

Witnesses:
Casimir Young.
May Downey.

Inventor:
Isak Gustaf Sundell.
By Oliphant & Young
Attorneys.

UNITED STATES PATENT OFFICE.

ISAK GUSTAF SUNDELL, OF HELSINGFORS, FINLAND, RUSSIA.

NAVIGATOR'S APPARATUS.

1,104,844. Specification of Letters Patent. Patented July 28, 1914.

Application filed November 11, 1910. Serial No. 591,835.

*To all whom it may concern:*

Be it known that I, ISAK GUSTAF SUNDELL, a subject of the Czar of Russia, and resident of Helsingfors, in the Province of Nyland, Finland, Russia, have invented certain new and useful Improvements in Navigators' Apparatus; and I do hereby declare that the following is a full, clear, and exact description thereof.

Owing to the usual way of dividing the card of a mariner's compass into points and into degrees, north and south being marked 0 and east and west 90°, there is a constant liability to error in the conversion of true, magnetic and compass courses into each other, as the same correction in one quadrant is to be added to, and in another subtracted from the number of degrees indicating a course; the possibility of errors in computation being further increased by the circumstance, that the rules governing said conversions of courses, naturally read one way in one case and the opposite way in another case, depending upon whether a true course is to be converted into a compass course, or the reverse. Yet it is a matter of the utmost importance for the safety of a ship, that the converting of courses and similar operations in navigation be correctly performed, for the reason that an error caused by making an allowance in a wrong direction may result in most disastrous consequences.

My invention therefore consists in what is herein particularly set forth with reference to the accompanying drawings and pointed out in the claim of this specification, its object being to aid in converting astronomical or true, magnetic, and compass courses, bearings and the like into each other, and in performing other operations in navigation based upon similar or coöperating principles, as well as to obviate the possibility of the errors noted in the foregoing, the apparatus specified being also useful as a help and controller in the computing of the deviation of the compass of a marine vessel.

Figure 1:
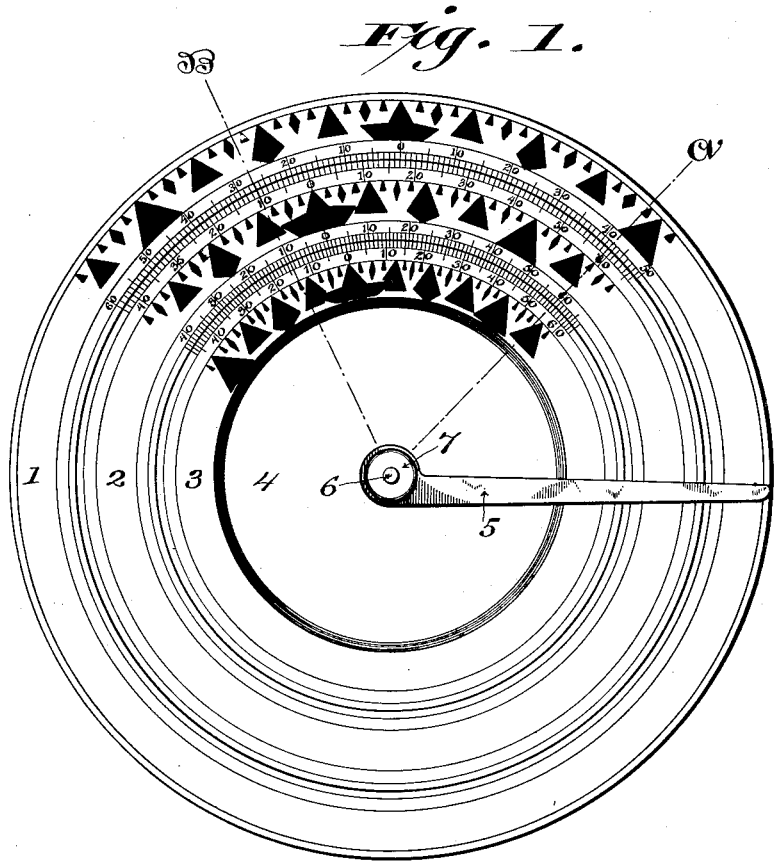
Figure 2:
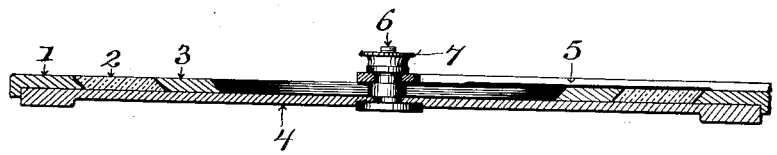

Figure 1 of the drawings represents a plan view of a preferred form of an apparatus in accordance with my invention, and Fig. 2, a central cross section of the same.

Referring by characters to the drawings, 1, 2, 3, indicate as many concentric circular scales that in practice are divided similar to the card of a mariner's compass, a portion of the division being herein shown. Two of the scales are necessarily adjustable but the other of said scales may be fast on a supporting base 4 as herein shown. For convenience in reading off from the scales, the apparatus may include indexing devices, such a device 5 being herein shown upon a center pivot screw 6 engaging a clamp-nut 7, but any suitable form of index, and any suitable means for clamping the movable parts of the apparatus in adjusted position are within the scope of my invention.

The scales are shown nested one within another, their opposing contact surfaces being beveled. The pivot-screw 6 is shouldered in opposition to the index device 5, and the nut 7 being run on said screw tight against said index device, the adjusted scales are clamped in position. The outer scale 1, may be assumed to represent the astronomical or true points of compass, the middle scale 2, the magnetic points, and the inner scale 3 the points of the card of a mariner's compass, the use of the aforesaid apparatus being explained by the following example: Assuming a true course taken from a chart to be N. 42° E., and that the magnetic variation is 17° W., the question arises as to the course to be steered by compass, deviation being corrected according to the deviation table: To this end the N. point or zero of the magnetic scale 2 is brought to coincide with 17° W. of the astronomical or true scale 1, and an index being positioned to mark N. 42° E. on said astronomical scale, as indicated by the dotted line A, the corresponding magnetic course will be found to be N. 59° E. Now assuming that it is found from the deviation table, that the magnetic course being N. 59° E., the deviation of the compass is 4° E., then the N. point or zero of the compass scale 3 is put 4° to the east from the corresponding point of the previously adjusted magnetic scale 2, and the index aforesaid marking true N. 42° E. will also indicate the corresponding compass course as N. 55° E.

A further use of the apparatus may be made when correcting bearings, which are taken by a compass. If the apparatus, after having been fixed for the course to be steered, is left undisturbed so long as the course is to be kept and the magnetic circumstances thus remaining unaltered, a compass bearing of some object out of the course may be directly converted into a true bearing by putting an index over the degree of the compass bearing, upon the scale representing the compass. For instance, a bearing of some object is taken, and found to be N. 14° W. by the compass. The index, after having been made to coincide with this direction upon the compass scale of the apparatus, also indicates, that the corresponding true bearing of the object is N. 27° W. (dotted line B in drawing). In this case it will be convenient to provide the apparatus with two indices, one for marking the course to be steered, the other serving for the conversion of true, magnetic and compass bearings into each other, said indices being indicated by the lines A and B. Also in finding the deviation of the compass by the azimuth of the sun or of some other celestial body or by the true bearing of a terrestrial object the apparatus will prove useful. The apparatus is corrected for magnetic variation, as above, by adjusting the magnetic scale into position with regard to the true or astronomical scale, and an index is allowed to indicate, upon the astronomical scale, the azimuth of the celestial body or the true bearing of the terrestrial object; then the compass scale is moved in order to bring the degree which indicates the bearing of the sighted object by the compass, into coincidence with the index, the amount and character of deviation being now marked by the distance, in degrees, between the N. points of the magnetic and compass scales.

From the aforesaid it is obvious, that my device will be a useful help in converting true, magnetic and compass courses, bearings, and so forth into each other, in finding the deviation of the compass by certain methods, for inspection of the ship's track as projected in the chart, and in other operations in navigation, the performing of which are in some way or other dependent upon the difference in position between true, magnetic and compass north.

It is to be noted, that the graduations of the scales are so arranged that those of the scale 2 are respectively in abutting contact with those of the scales 1 and 3, so that the zero mark of one series of graduations may be accurately registered with a graduation of the adjacent scale, this being an important feature of my invention, in order that the exact adjusting of the apparatus may be performed by simply moving the loose scales. It is also to be noted that the herein described apparatus is designed as a calculator and as means for keeping the reckoning of a marine vessel, instead of being designed as a complete bearing instrument that must be necessarily arranged in a convenient place aboard ship, so that a diametrical line passing through a point indicative of the ship's head shall be parallel with the keel of the vessel.

I claim:

The combination of a plurality of concentric scales having nesting portions one within another and each divided into points and degrees similar to the card of a mariner's compass, one or more of the scales being independently adjustable with relation to the remainder thereof, a base upon which the scales are supported, a shouldered screw mounted central of the base, an index device pivoted on the screw against the shoulder of the same to extend across the scales, and a clamp-nut on said screw over said index device.

In testimony that I claim the foregoing I have hereunto set my hand at Helsingfors, in the county of Nyland, Finland, Russia, in the presence of two witnesses.

ISAK GUSTAF SUNDELL.

Witnesses:
RUD. ÅKERBLOM,
K. A. SÖTTERMAN.